United States Patent [19]

Paranjpe

[11] 4,219,822

[45] Aug. 26, 1980

[54] SKEWED INK JET PRINTER WITH OVERLAPPING PRINT LINES

[75] Inventor: Suresh C. Paranjpe, Xenia, Ohio

[73] Assignee: The Mead Corporation, Dayton, Ohio

[21] Appl. No.: 934,351

[22] Filed: Aug. 17, 1978

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,298,030 | 6/1967 | Lewis et al. | 346/75 |
| 3,701,998 | 10/1972 | Mathis | 346/75 |
| 3,739,395 | 6/1973 | King | 346/75 |
| 4,010,477 | 3/1977 | Frey | 346/75 |
| 4,060,804 | 11/1977 | Yamada | 346/75 X |
| 4,085,409 | 4/1978 | Paranjpe | 346/75 |
| 4,122,458 | 10/1978 | Paranjpe | 346/75 |

*Primary Examiner*—George H. Miller, Jr.

*Attorney, Agent, or Firm*—Biebel, French & Nauman

[57] ABSTRACT

An ink jet printer for printing a print image on a print medium selectively deposits ink drops at a plurality of print positions on the medium with each print position defining a print line on the medium extending in the direction of relative movement of the medium. A means for generating a plurality of drop jets directs the jet toward the print medium. A means is provided for selectively deflecting drops from each drop jet to print positions in an associated group of the plurality of print positions. At least two of the print positions in each group of print positions define print lines which substantially overlap the print lines defined by print positions in adjacent groups of print positions.

6 Claims, 9 Drawing Figures

SKEWED INK JET PRINTER WITH OVERLAPPING PRINT LINES

BACKGROUND OF THE INVENTION

The present invention relates generally to the field of fluid drop generation and the application thereof to jet drop recorders of the type shown in U.S. Pat. No. 3,701,998 to Mathis, issued Oct. 31, 1972. In recorders of this type, one or more rows of orifices in a plate receive an electrically conductive recording fluid, such as a water base ink, from a pressurized fluid manifold and eject the fluid in parallel streams. The streams are broken up into drops as a result of the application of a series of travelling waves to the plate or other mechanical stimulation, such as the application of compression waves to the fluid in the manifold. Graphic reproduction in recorders of this type is accomplished by selectively charging and deflecting some of the drops in each of the streams and thereafter depositing drops on a moving web of paper or other material.

Charging of the drops is accomplished by application of charge control signals to charging electrodes near the edge of the drop streams. Charges are induced in the ends of fluid filaments emerging from the orifices by the charge control signals. As the drops separate from their parent fluid filaments, they carry a portion of the charge applied by the charging electrodes. Thereafter, the drops pass through electrostatic fields which have no effect on the uncharged drops but which cause the charged drops to be deflected. Drops which are not to be printed are charged sufficiently such that they are deflected to a catcher which services the drop streams.

One problem with ink jet printers has been attaining sufficient image resolution. Since a discrete number of drops are applied to form the images, it is clear that image definition may be improved by increasing the number of drops and providing a proportionate increase in data handling capability. If, however, only one print position on the print web is serviced by each orifice, the number of print positions per unit width and therefore the resolution of the image in the direction transverse to the web is limited by the minimum dimensions required between adjacent orifices. The approach taken in the Mathis device is to provide two rows of drop streams, with each row of streams being perpendicular to the direction of web movement and the drops from one row of the drop streams servicing print positions which interlace with those serviced by the other row of drop streams. The charging of drops in the two rows is timed such that printing from the two rows of streams is in registration. The separation between adjacent streams in each of the rows is therefore twice that which would be required in a one row printer of comparable resolution.

Another approach to improved resolution is shown in U.S. Pat. No. 3,739,395, to King, issued June 12, 1973, and assigned to the assignee of the present invention. In the King device, uncharged drops are caught and thus do not print, while charged drops from each orifice are deflected by two sets of deflection electrodes to a plurality of discrete positions on the moving web. Deflection of the drops is either perpendicular or parallel to the direction of web movement, or both, covering either a one-line matrix or a multiple-line matrix on the web. Since a number of print positions on the web are serviced by each jet, the distance between orifices may be greater than if each orifice serviced only one print position, while maintaining comparable resolution. The minimum required spacing between adjacent orifices is somewhat greater with the King device than with other prior art printers, however, since deflection electrodes must be positioned on all sides of each orifice.

U.S. Pat. No. 3,298,030, issued Jan. 10, 1967, to Lewis et al, discloses a multiple jet printer in which each jet services a number of print positions on the print web. The structure for generating deflection fields in the Lewis et al device, however, requires positioning electrodes between each adjacent jet, thereby limiting the minimum interjet spacing.

Another approach to increasing the effective resolution in an ink jet printer is shown in U.S. Pat. No. 4,010,477, issued Mar. 1, 1977, to Frey. In the Frey patent, a plurality of parallel rows of jets are provided, each row being positioned along a line which is inclined to the direction of web movement. Each row of jets services a group of print positions defining a band of adjacent print lines which extend along the length of the print web. The Frey printer is a binary printer; that is, each jet services only a single print position and the drops in each jet are charged to one of two discrete charge levels.

U.S. Pat. No. 4,085,409, issued April 18, 1978, to Paranjpe, discloses a printer which is somewhat similar in construction to that of the Mathis printer described above. The rows of jets in the Paranjpe printer are positioned along parallel lines which are inclined to the direction of web movement. Drops in each of the jet drop streams are selectively charged to several charge levels such that they are deflected to service a number of print positions. The inclined printer of Paranjpe provides improved resolution across the width of the web, both as a result of positioning the rows of jets along lines which are inclined with respect to the movement of the print web and by virtue of the fact that each jet services a number of print positions. Because of the deflection electrode position in the Paranjpe printer, the deflection fields are created by electrodes which do not extend between adjacent jets. The inter-jet spacing is therefore not limited by the deflection electrode structure.

In a printer such as shown in the Paranjpe patent, the drops from the drop streams may be accurately deposited at print positions on the web and thus provide a high resolution print image across the width of the web, providing that each of the jets is accurately positioned along the line of jets. Should one of the jets in such a system be slightly crooked, the band of print lines which it services will be laterally displaced from the desired position with the result that a small gap between the band serviced by the crooked jet and one of the adjacent bands of print lines will be produced in which no printing may be accomplished. Since most of the print image created by the printer will be of extremely high resolution, even small interband gaps will be noticeable and will detract significantly from the appearance of the final print image.

U.S. Pat. No. 4,060,804, issued Nov. 29, 1977, to Yamada, discloses an ink jet printing device in which two jets are provided for printing at two adjacent groups of print positions. In order to minimize the possibility of a gap or deterioration along the boundary of the bands of print lines serviced by the two jets, the jets are positioned such that the print lines in each of the groups adjacent the boundary are serviced by drops from the respective jets which are deflected the least. This arrangement is said to minimize the effect of errors in drop positioning which result from errors in the deflection of the drops. If one or both of the jets are crooked, however, this scheme will not provide an improvement in image quality.

It is seen, therefore, that a need exists for a printer in which each jet services a number of print positions forming a band of print lines along the print web and in which the effects of a crooked jet on the resulting print image are minimized.

SUMMARY OF THE INVENTION

An ink jet printer for printing a print image on a print medium selectively deposits ink drops at a plurality of print positions on the print medium with each print position defining a print line on the web extending in the direction of relative movement of the print medium. Means are provided for generating a plurality of drop jets directed toward the print medium. Means are also provided for selectively deflecting drops from each drop jet to print positions in an associated group of print positions. At least two of the print positions in each group of print positions define print lines which substantially overlap with print lines defined by print positions in adjacent groups of print positions.

The means for selectively deflecting drops from each drop jet may comprise charge electrode means for selectively charging each of said drops to one of a plurality of charge levels, including a catch level in response to charging signals. Means generate an electrical deflection field for deflecting drops and a catcher means catches the drops which have a catch charge level. Charging signals are supplied to the charge electrode means such that drops are appropriately deflected to form collectively the desired print image. The drops in adjacent jets which are directed to print positions defining overlapping print lines are charged such that the pattern of drops deposited on the overlapping print lines by a jet is substantially the same as the pattern of drops deposited on the overlapping print lines by the adjacent jets.

The means for selectively deflecting drops may include means for deflecting fewer drops from each jet to the print positions defining print lines which substantially overlap than to the remainder of the print positions in the group serviced by the jet.

The jet streams may be evenly spaced along the jet row with the print medium being moved relative to the jet row such that the direction of movement of the print medium is oblique with respect to the jet row.

Accordingly, it is an object of the present invention to provide a multiple jet printer which each jet services a number of print positions with the print lines defined by print positions from adjacent jets overlapping substantially; to provide such a printer in which each jet provides fewer drops to the print positions which overlap; to provide such a printer in which the jets are arranged along a jet row which is oblique to the direction of relative movement of the print medium; and, to provide such a printer in which properly timed data is supplied to the jets whereby the overlapping print lines from adjacent jets will have deposited thereon drops in substantially identical patterns from adjacent jets.

DETAILED DESCRIPTION OF THE PREFERRED EMBODIMENT

Figure 1:
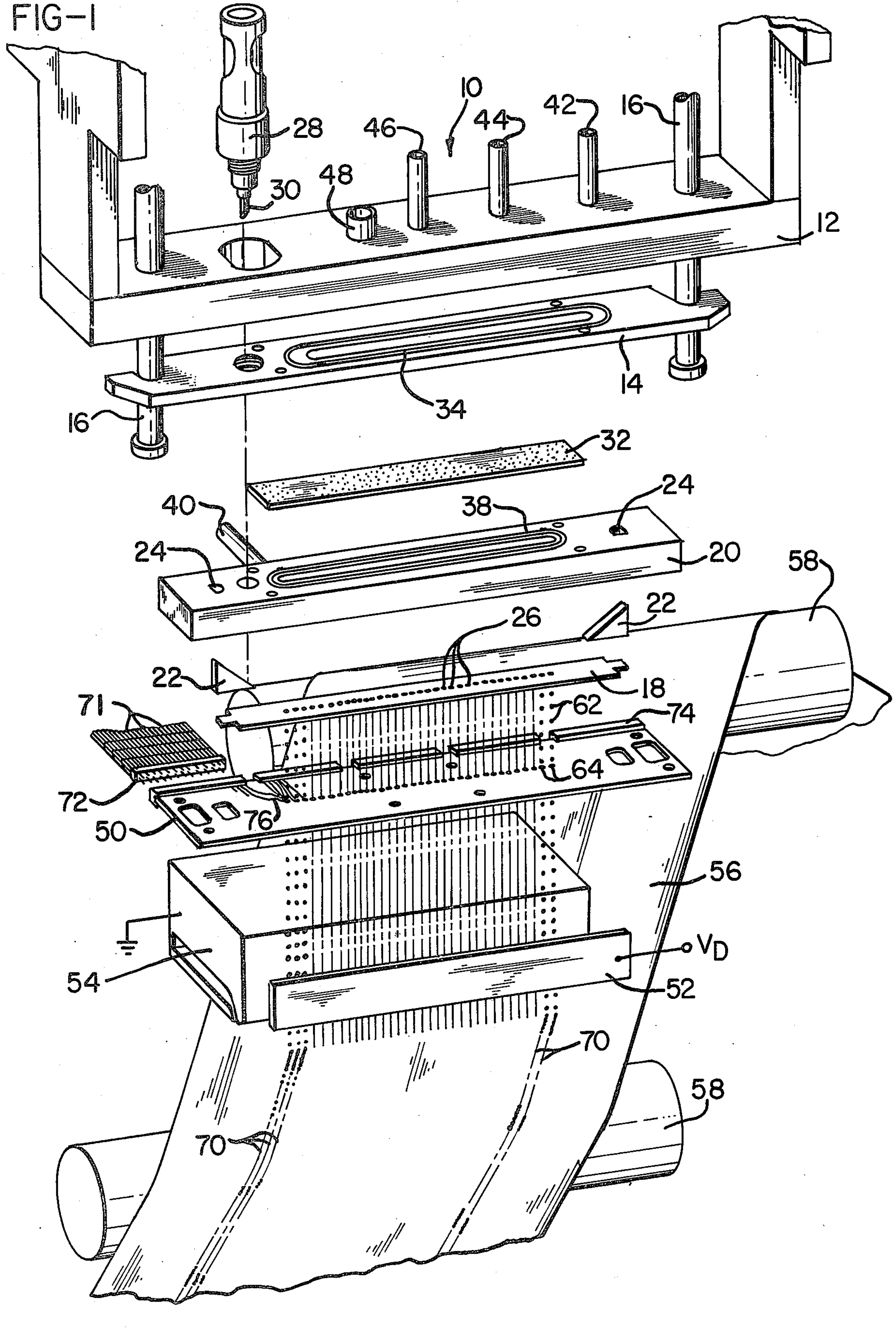
FIG. 1 is a diagrammatic exploded perspective view of the ink jet printer of the present invention.

The present invention relates to an ink jet printer for printing text and graphics on a moving web of paper or other print receiving medium. Alternatively, the print medium may be stationary and relative movement between the print medium and the printer effectuated by movement of the printer. FIG. 1 is a diagrammatic exploded perspective view illustrating a printer embodying the present invention. The various elements of a head assembly 10 are assembled for support by a support bar 12. Assembly thereto is accomplished by attaching the elements by means of machine screws (not shown) to a clamp bar 14 which, in turn, is connected to the support bar 12 by means of clamp rods 16.

The recording head comprises an orifice plate 18 soldered, welded or otherwise bonded to fluid supply manifold 20 with a pair of wedge-shaped acoustical dampers 22 therebetween. Orifice plate 18 is preferably formed of a relatively stiff material which is also relatively thin to provide the required flexibility for direct contact stimulation. Preferably dampers 22 are cast in place by pouring polyurethane rubber or other suitable damping material through openings 24 while tilting manifold 20 at an appropriate angle from the vertical. This is a two-step operation as dampers 22 require tilting in opposite directions.

Orifice plate 18 defines a row of orifices 26 and is stimulated by a stimulator 28 which is threaded into clamp bar 14 to carry a stimulation probe 30 through the manifold 20 into direct contact with plate 18. Orifice plate 18, manifold 20, clamp bar 14, together with filter plate 32 and O-rings 34, 36 and 38 (see FIG. 2) comprise a clean assembly which may be preassembled and kept closed to prevent dirt or foreign material from reaching and clogging orifices 26. Conduit 40 may be provided for flushing the clean package. Service connections for the recording head include a coating fluid supply tube 42, air exhaust and inlet tubes 44 and 46, and a tube 48 for connection to a pressure transducer (not shown).

Other major elements of the printer include a charge ring plate 50, an electrically conductive deflection electrode 52, and a catcher 54. A print web 56 is moved past the printer over rolls 58 by a conventional web drive mechanism (not shown). Alternatively, the print web 56 may be stationary and the printer transported past the web 56. In either case, a means is provided for effectuating relative movement between the web and the printer.

Figure 2:
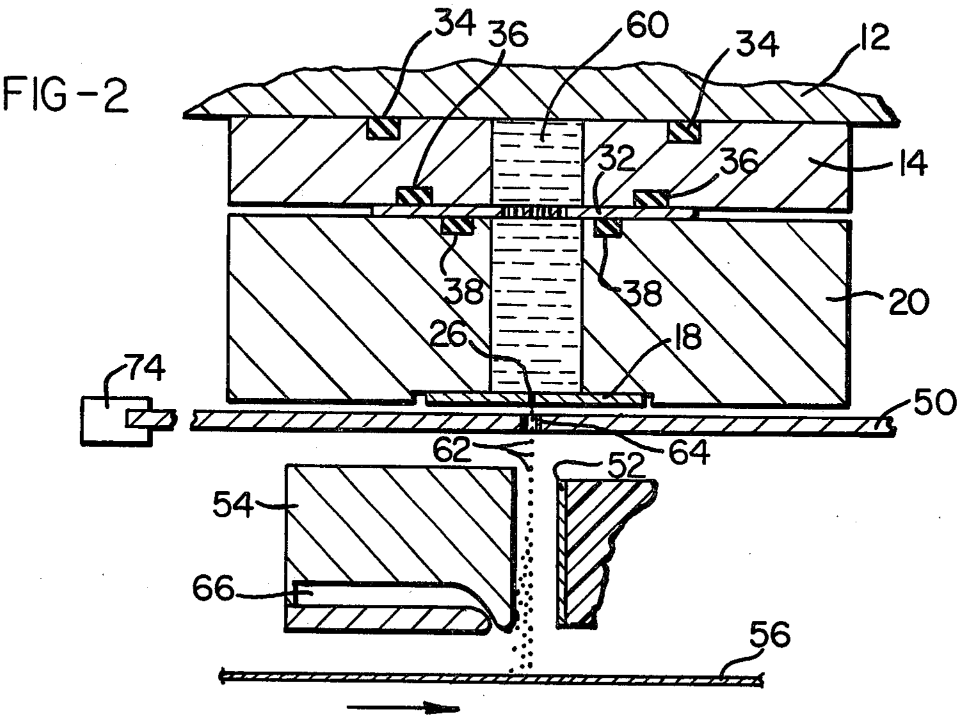
FIG. 2 is a sectional view through the printer of FIG. 1, as seen looking generally left to right in FIG. 1.

The ink jet printer of FIG. 1 is shown in cross section in FIG. 2. As therein illustrated, conductive ink 60 flows downwardly through orifices 26 forming a row of drop jets which are directed toward the print web 56. Each drop jet consists of a plurality of drops 62. Drops 62 then pass through one of a plurality of charge rings 64 which is associated with a drop jet on the charge ring plate 50 and thence into the catcher 54 or onto the moving print web, striking the web at one of a plurality of print positions. Switching of drops between "catch" and the various print position trajectories is accomplished by electrostatic charging and deflection, as hereinafter described.

Formation of drops 62 is closely controlled by application of a constant frequency, controlled amplitude, stimulating disturbance to each of the jet streams emanating from orifice plate 18. Disturbances for this purpose may be set up by operating transducer 28 to vibrate probe 30 at constant amplitude and frequency against plate 18. This causes a continuing series of bending waves to travel the length of plate 18, each wave producing a drop stimulating disturbance to each of the jets as it passes over the orifices 26 in succession. Dampers 22 prevent reflection and repropogation of these waves. Accordingly, each jet comprises an unbroken fluid filament and a series of uniformly sized and regularly occurring drops, all in accordance with the well known Rayleigh jet break-up phenomenon.

As each drop 62 is formed, it is exposed to the charging influence of the associated charge ring 64. If the drop is to be deflected and caught, an electrical charge of predetermined charge level is applied to the associated charge ring 64 during the instant of drop formation. This causes an electrical charge to be induced in the tip of the fluid filament and carried away by the drop. As the drop traverses the deflecting field set up between the charged electrode 52, which is held at an elevated potential $V_d$, and the face of the grounded catcher 54, it is deflected to strike the catcher. The drop will then run down the face of the catcher and be ingested into cavity 66. Drop ingestion may be promoted by application of a suitable vacuum to the ends of the catcher 54.

When a drop 62 is to be directed to a print position on the web 56, the drop is not charged or is charged to a level which is less than that which would cause it to be deflected and caught by the catcher 54. The drop will therefore be deflected slightly in a direction which is perpendicular to the jet row, such that it will strike the print web at a selected print position. As can be seen in FIG. 1, the print web 56 is moved past the jet row in a direction which is oblique with respect to the row. Each of the drops in the jet drop streams may be selectively deflected in a direction which is perpendicular with respect to the jet row. The amount of deflection will be a direct function of the charge carried by the individual drop.

Figure 3:
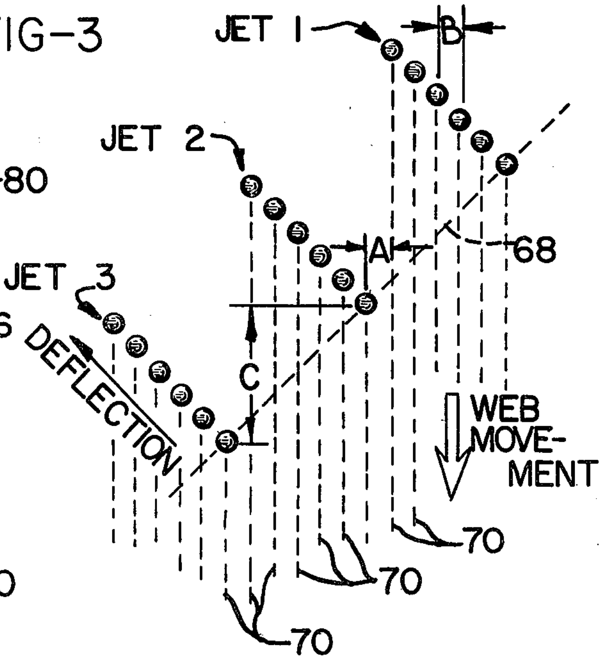
FIG. 3 illustrates a non-overlapping print position pattern.

FIG. 3 illustrates a non-overlapping print position pattern which could be utilized in the printer of FIG. 1. A similar print position pattern is disclosed in applicant's co-pending patent application Ser. No. 825,975, filed Aug. 19, 1977, now U.S. Pat. No. 4,122,458, issued Oct. 24, 1978 and assigned to the assignee of the present invention. FIG. 3 is a diagrammatic representation of the print positions on the print web as seen from a point above the web. The jets are positioned directly above the print positions on line 68.

When a drop from a jet receives no charge, it will therefore strike the print web at the associated print position on line 68. The addition of a small charge to a drop will cause the drop to be deflected in a direction perpendicular to the row of jets to an adjacent print position. Successively larger charge levels on the drops will result in successively greater deflection of drops outward from the print positions on line 68. As the print web moves past the printer, the drops deposited at each print position will form an associated print line, illustrated diagrammatically in FIG. 3 at 70. The resulting space B between adjacent print lines defined by print positions associated with a single jet should ideally equal the space A between print lines defined by print positions from adjacent jets.

It will be appreciated that since the drops making up the print image along a line transverse to the direction of web movement are deposited on the web at different times by the jets in the jet row, the electronic control data defining the print image along such a line will necessarily have to be re-ordered before it is used to control the deposit of drops at the print positions. It will be appreciated that a data delay equal to the time required for the web to move the distance C will necessarily be required to be imposed between adjacent jets.

Charging of drops is accomplished by setting up an appropriate electrical potential difference between orifice plate 18 (or any conductive structure in the electrical contact with the coating fluid supply) and each of the charge rings 64. These potential differences are created by grounding plate 18 and applying appropriately timed voltage pulses to wires 71 via connectors 72 (only one such connector being illustrated in FIG. 1). Connectors 72 are plugged into receptacles 74 at the edge of the charge ring plate 50 and deliver the required voltage pulses over printed circuit lines 76 to charge rings 64. Charge ring plate 50 is fabricated from insulative material and charge rings 64 may be merely coatings of conductive material lining the surfaces of orifices in the charge ring plate.

Deflection of drops 62 which are charged to a catch charge level, or a lesser charge level, is accomplished by creating an electrical field between the deflection electrode 52 and the catcher 54. The deflection electrode 52 may be charged to a deflection potential level $V_d$, thereby setting up a deflection field between the electrode 52 and the grounded catcher 54. The charged drops in the jet streams may carry a charge which is of the same polarity as the deflection potential $V_d$, so that the drops are deflected away from the electrode 52 toward the catcher 54. Alternatively, some or all of the drops could receive charges of opposite polarity. In such a case, however, the position of the catcher 54 and the electrode 52 would necessarily be adjusted with respect to the drop streams to provide for selective catching of the drops.

It has been found that, if desired, more than one drop may be deposited at each print position on the web. Two successive drops directed to the same print position will tend to pile up and spread in all directions, behaving much like one drop of larger volume. It will be appreciated that the web speed must be reduced somewhat with a multiple drop per print position printing arrangement so that movement of the web between deposit of successive drops will not be substantial.

Figure 4:
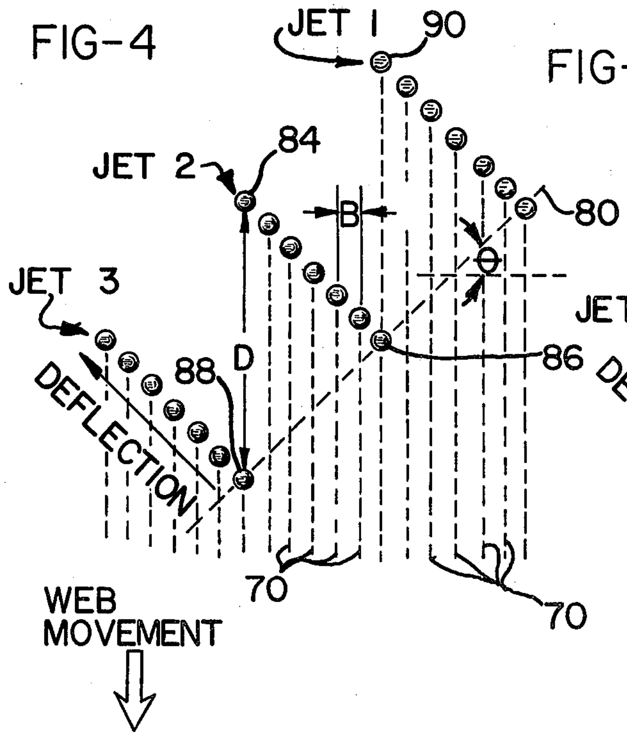
FIG. 4 illustrates the overlapping print position pattern of the printer of the present invention.

FIG. 4 which is a diagrammatic view, similar to FIG. 3, illustrating the print position scheme of the printer of the present invention. Each of the drop jets services print positions in an associated group of the plurality of print positions. The uncharged drops from each jet will be deposited in the print positions extended along line 80. The drops will be deflected away from line 80, as indicated, in dependence upon the charge level induced therein. The greater the charge induced in each drop, the greater the deflection which will result. Each of the print positions defines an associated print line 70 on the web, with each of the print lines being laterally displaced from adjacent lines by a minimal distance B such that printing may be accomplished without interruption across the web.

It will be noted that the drops which are deflected by the greatest and the least amounts in each drop stream will service print positions defining print lines which overlap with print lines serviced by adjacent streams. Thus, in jet 2, print positions 84 and 86 define print lines which overlap with print lines defined by print positions 88 and 90, respectively, in the adjacent group of print positions. It is desirable in such an arrangement to provide the same print data to the jets for the overlapping print lines such that these overlapping print lines will be identical. It is apparent that the print data controlling deposit of drops at position 88 will necessarily be delayed by a time equal to that required for web movement of the distance D with respect to the application of such data to control deposit of drops position 84.

In one embodiment of the present invention, one drop will be deposited, if required, at each successive print position on the web in a cyclic fashion. This will result in twice as many drops being deposited on those print lines which are serviced by two adjacent jets. It has been found, however, that this increase in the ink deposited along overlapping lines does not result in a deterioration in print image quality. In an alternative printing device embodying the present invention, two drops may be deposited at each position by each jet, with the exception of those print positions defining overlapping print lines. The latter print positions will receive only a single drop during each printing cycle from each jet. The number of drops deposited upon each print line will therefore remain substantially uniform across the print web. Thus fewer drops are deflected to print positions defining print lines which substantially overlap than to the remainder of the print positions in the groups serviced by each jet.

Figure 5:
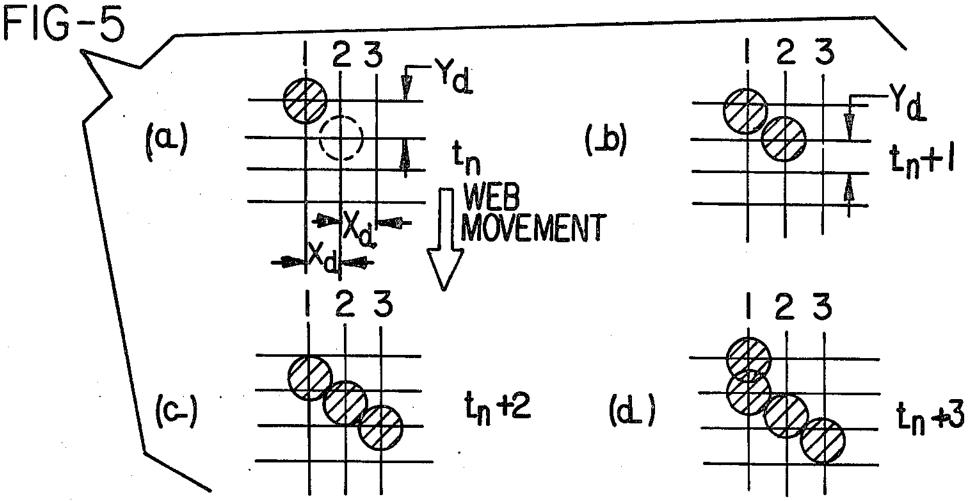
FIGS. 5 (*a*)-5(*d*) illustrate timing consideration for drop deposit.

Reference is now made to FIGS. 5(*a*)-5(*d*), which show for the sake of illustration printing with three print positions being serviced by a single jet. It will be appreciated that a greater number of print positions may advantageously be serviced by each jet. It is apparent that since the web is moving and since of the three print positions is printed in succession at different times, that the web will have moved some distance between printing of each print position. For simplicity of analysis it is assumed that one drop is being deposited at each of the print positions in succession. In FIG. 5(*a*) print position 1 is printed at time $t_n$. At time $t_n+1$, print position 2 is printed as shown in FIGS. 5(*b*). Note that the print position 1 drop previously printed has now moved by one-third of the basic resolution element (equal to $X_d$) since it was printed at time $t_n$. At time $t_n+2$, as seen in FIG. 5(*c*), the print position 3 drop is printed. At this time, the print position 1 drop has moved two-thirds of a basic resolution element, while the print position 2 drop has moved one-third of a basic resolution element. At time $t_n+3$ the print position 1 is again serviced.

This sequence of print matrix diagrams illustrates printing for a bar which is inclined at 45° while the web is running at maximum velocity. This arrangement will not provide a square matrix of print positions because, as seen in FIG. 5(*d*), the line of jet drops will be skewed from the horizontal. Inclination of the bar can be changed, however, to compensate for this error. The orientation of the bar is adjusted so that the vertical deflection is increased by the amount that each drop moves during a print time period $t_p$. The angle of the print bar with respect to a transverse reference line is $\theta=\tan^{-1}(X_d/Y_d)$. To correct for the velocity error, $$Y_d=nX_d+V_wt_p,$$

where $Y_d$ = vertical deflection distance, n = any integer including 0 (number of integer data delays assigned into the system), and $V_w$ = any fixed web velocity not to exceed $V_w$ max.

When a data delay is introduced, successively serviced print positions will form a pair of successive transverse lines and print information. When a system operates at its maximum web velocity, this equation reduced to $$Y_d=X_d(n+1/M)$$

and the equation for $\theta$ becomes $$\theta = \tan^{-1}\left(\frac{1}{n+1/M}\right);$$

where M = number of print positions serviced by each jet.

Figure 6:
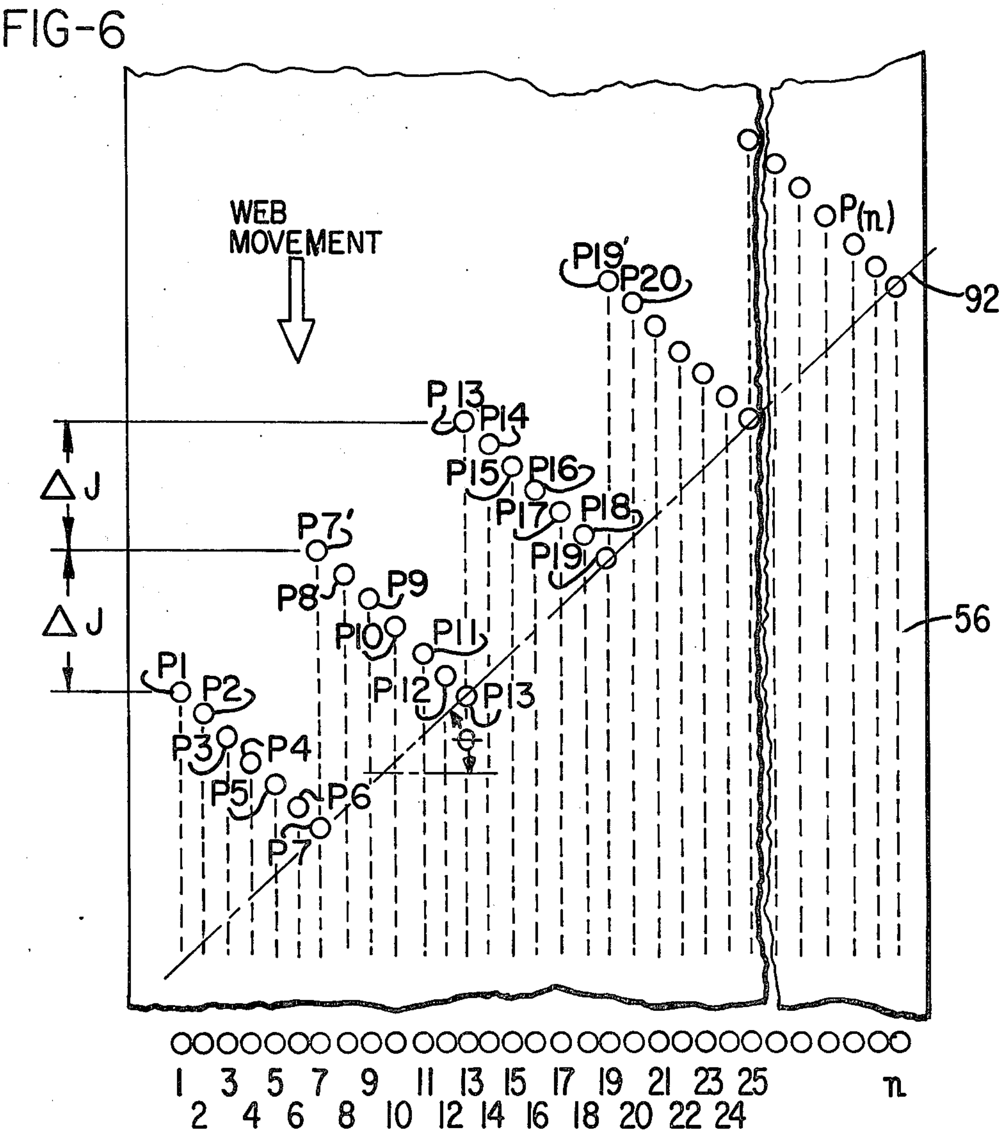
FIG. 6 is a diagrammatic representation of a print receiving medium, as seen from above, illustrating overlapping print positions.

FIG. 6 represents diagrammatically the relative points or print positions at which drops in print projectories strike the print web 56. The dashed line 92 represents the position of the row of drop streams with respect to the web 56. The jet furthest to the left will service print positions $P_1$-$P_7$; the second jet from the left will service print positions $P_7$, $-P_{13}$, etc. Although seven print positions per jet are illustrated, the servicing of fewer print positions per jet may provide a sufficient increase in resolution detail for some purposes while requiring less control circuitry.

The row of jets is inclined at the angle $\theta$ with respect to a transverse reference line across the web. The longitudinal displacement between print positions is equal to $Y_d$ while the transverse displacement between print positions is equal to $X_d$. It is apparent that the time required to generate one drop is $t_o=1/f_o$, where $t_o$ equals the time to generate each ink drop, and $f_o$ equals the frequency at which drops are generated from each jet. Also, the time required to print a dot or print positions $t_p$ is equal to $R/f_o$, where $t_p$ is equal to the time to print each dot, and N equals the number of drops per dot.

Assuming that resolution in the longitudinal direction is to equal resolution in the transverse direction, if each jet is deflected to print in M different print positions, the web must not move more than one resolution element ($X_d$) in the time required to print all Q dots: $V_{w\,max}=X_df_o/MN$, where $V_{w\,max}$ equals maximum print web velocity, and Q equals number of print positions serviced by each jet.

The control data for controlling deposit of drops at print positions $P_7$ and $P_7'$, will necessarily be identical but with the data controlling deposit of drops at $P_7$ being delayed by an appropriate time period such that the pattern of drops along the print line common to these print positions receives appropriately placed drops from both of the jets servicing the print line. It is apparent that the drops which are deflected by the greatest and least amounts in each drop stream service print positions defining print lines which overlap with print lines serviced by adjacent drop streams.

The net result is to provide for continuous printing across the entire width of the print web 56. Should one of the jets be slightly crooked, the overlap between the print lines serviced by adjacent jets and the crooked jet will insure that printing across the entire width of the web may still be accomplished. Although the crooked jet will result in a slight deterioration of the print image this deterioration will be much less noticeable than if an overlapping print line pattern were not used, since in such a case an unprinted band extending along the length of the print web would result.

Figure 7:
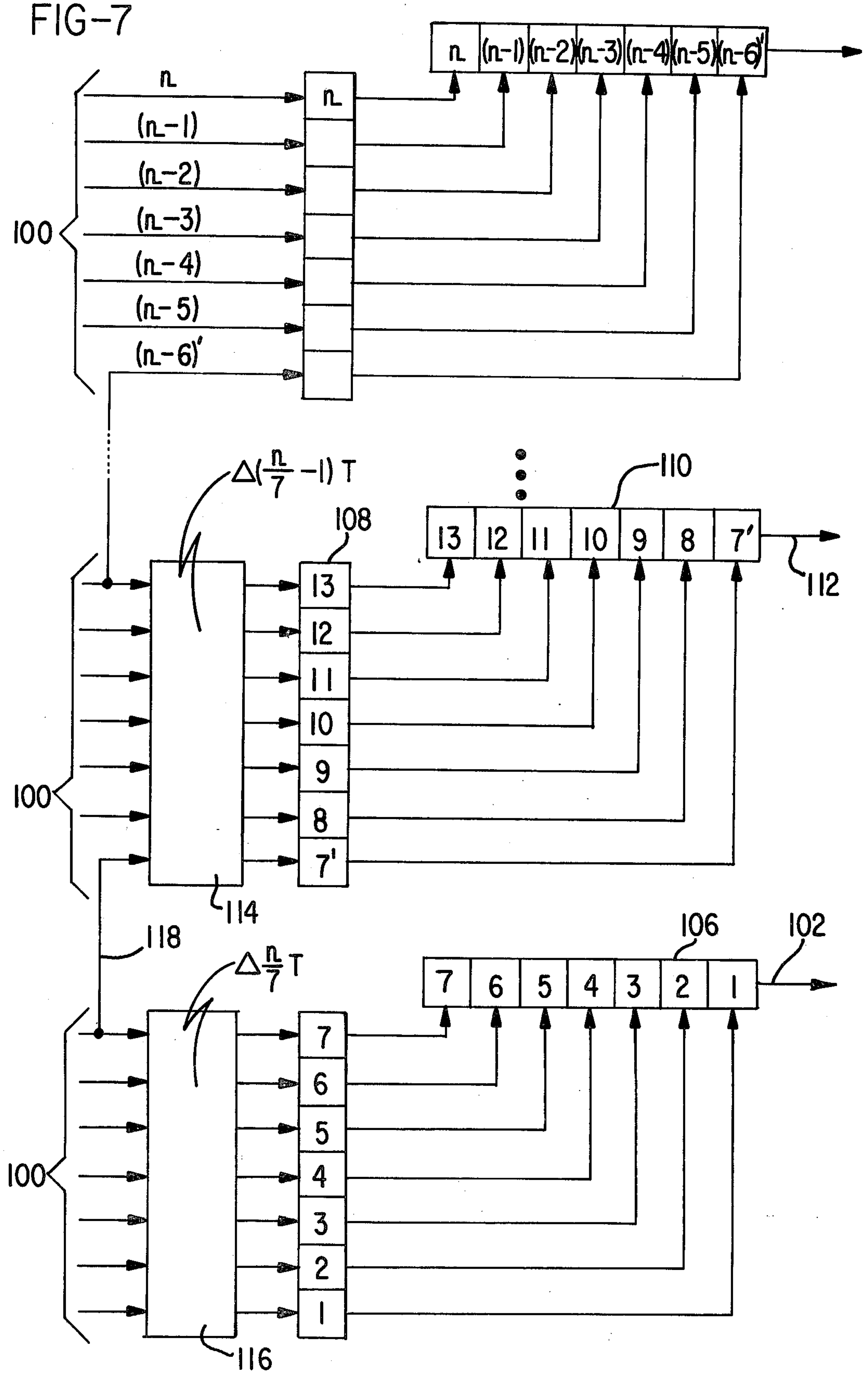
FIGS. 7-9 illustrate data ordering arrangements useful in preparing data for application to jet control circuitry.

One arrangement for ordering print data properly for application to jet control circuitry is shown in FIG. 7. The illustrated arrangement is for a seven print position jet printer, but it is understood that simple modifications would make this arrangement applicable to other configurations. A complete line of print information defining the print image in a line transverse to the web is assembled by a control computer in a manner well known in the art such as shown in U.S. Pat. No. 3,913,719 issued Feb. 24, 1975, to Frey, and assigned to the assignee of the present invention. The line of print data is supplied to lines 100 and specifies in binary form whether a dot is to be printed at each of the print positions across the width of the print web. As seen in FIG. 6, however, this information cannot simply be supplied in parallel without appropriate delay to each of the drop jet control circuits, since the drops for positions 1 through n are each applied at a separate discrete time.

Since the print positions $P_1$, $P_2$, $P_3$, $P_4$, $P_5$, $P_6$, and $P_7$ are serviced in that order by a single jet, print data which is to be supplied to the control circuit for this jet via line 102 is serialized by register 104 and shift register 106. The rate at which shift register 106 is shifted will be dependent upon the rate at which the jet is switched between print positions. Assuming one drop is deposited at each print position, the shift register 106 will be shifted at the stimulation frequency. In similar fashion, registers 108 and 110 will serialize data for application via line 112 to the jet control circuit which services print positions $P_7'$-$P_{13}$. It will be appreciated, however, that this jet will necessarily be printing at times preceding those during which the first jet prints.

The necessary time delay differential between adjacent jets $\Delta T$ is dependent upon the time which it takes the web 56 to move the distance $\Delta J$ (FIG. 6) between corresponding positions of successive jets. This delay may be provided with shift registers of the appropriate length which are clocked by tachometer pulses providing an indication of the speed of web movement. The delay provided for the supply of data to the second jet by means of register 114 will therefore be such that it is less than the delay provided by register 116 by an amount equal to $\Delta T$. Note that the same control data is provided on line 118 for control of print position $P_7'$ as is provided for control of print position $P_7$. Successively shorter data delays are needed for each of the jets, going from left to right in FIG. 6, such that the jet servicing print positions $P_n$-$P_{(n-6)}'$ will not be delayed.

Figure 8:
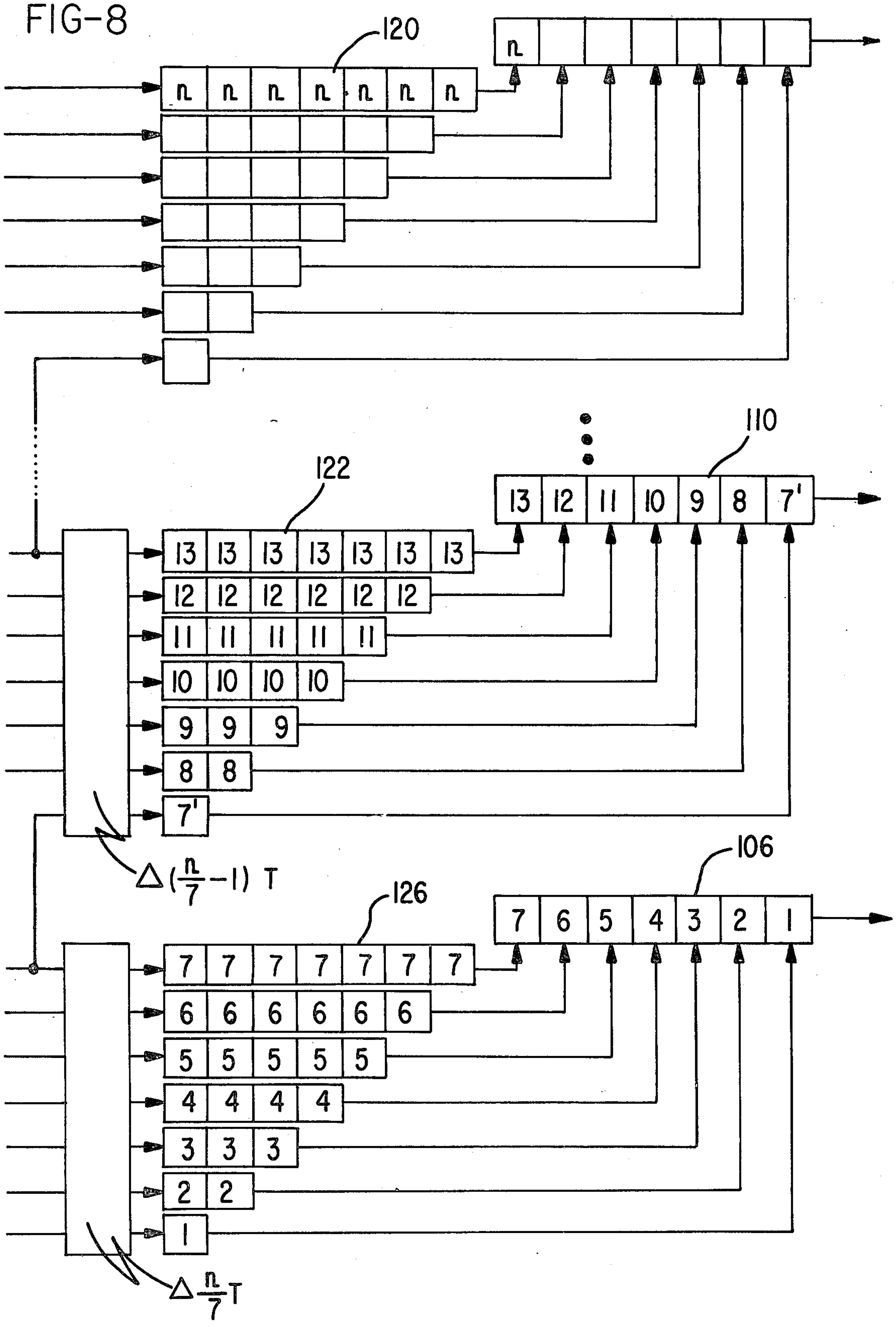

Reference is now made to FIG. 8 which illustrates an alternative data assembly arrangement. The circuit of FIG. 8 is similar to that of FIG. 7, with the exception that a series of shift registers of staggered length 120, 122, etc., are provided in place of register 114, 116, etc. Registers 120 provide a one increment data delay between print positions which permits the print bar to be positioned at less of an angle, as discussed previously. As is apparent from the drawings, the print data assembled in registers 106, 110, etc., controls printing on seven successive transverse lines across the web, rather than on a single transverse line, as is the case in FIG. 7.

Figure 9:
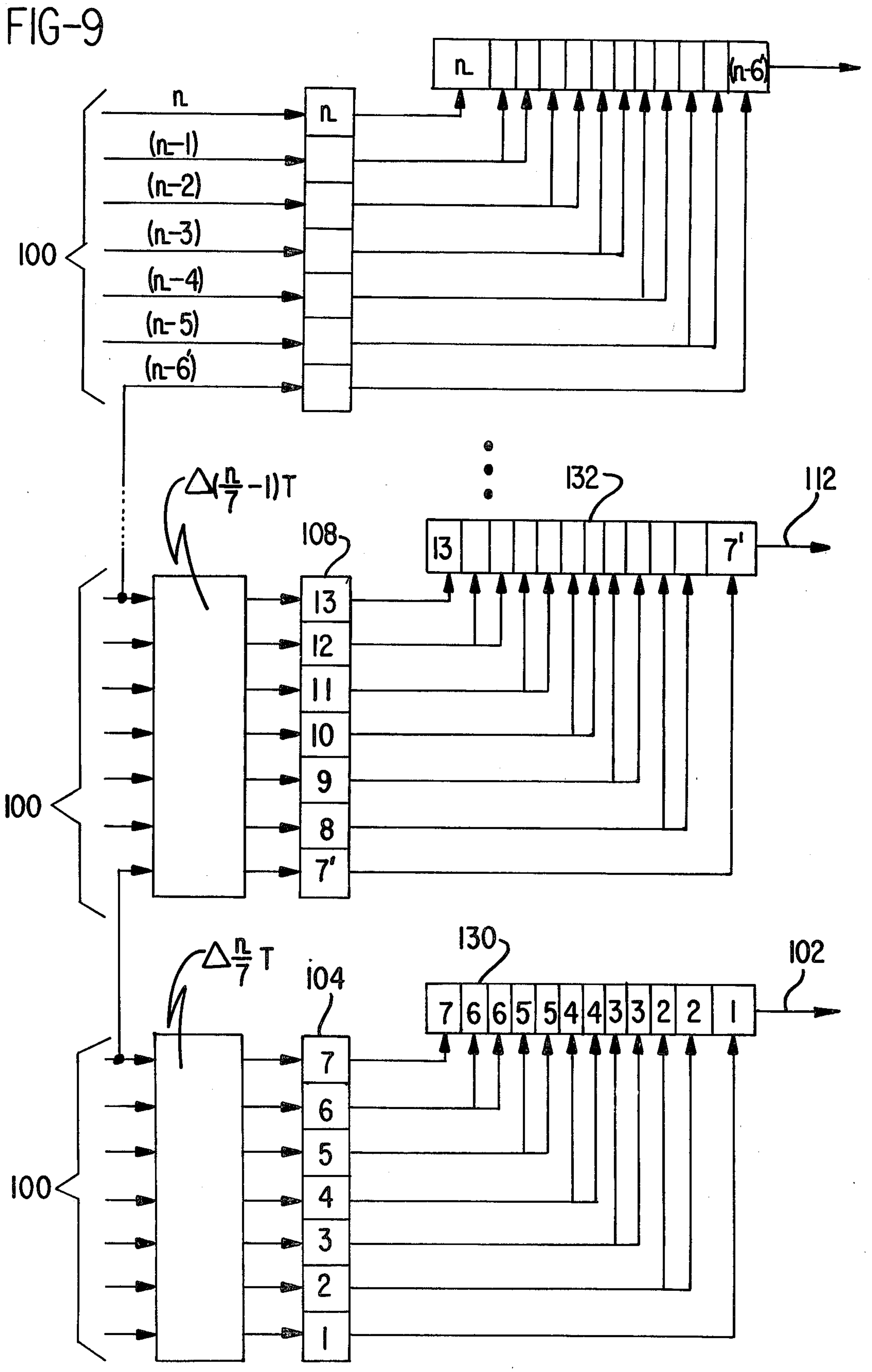

Reference is now made to FIG. 9 which is similar to FIG. 7 with the exception that the shift registers 130, 132, etc., each provide at their outputs print control data which is repetitive, except as to the print positions serviced by drops which are deflected the least and the greatest. Thus with respect to register 130, it is seen that the output 102 will receive print control data in the following order: $P_1$, $P_2$, $P_2$, $P_3$, $P_3$, $P_4$, $P_4$, $P_5$, $P_5$, $P_6$, $P_6$, $P_7$. Thus the arrangement of FIG. 9 provides for proper ordering of print control data where fewer drops are to be deflected from each jet to print positions defining print lines which substantially overlap than to the remainder of the print positions in the group serviced by the jet.

As discussed previously, the control data supplied on the shift register outputs in FIGS. 7-9 will be in binary form, indicating whether a drop is to be deposited at each of the print positions in succession. This print data is then used to control an electronic switching arrangement which will supply either a catch potential to the appropriate charge ring or, alternatively, one of a plurality of charge levels which will cause the drops to be deflected to the appropriate print positions.

While the forms of apparatus herein described constitute preferred embodiments of the invention, it is to be understood that the invention is not limited to these precise forms of apparatus, and that changes may be made therein without departing from the scope of the invention.

What is claimed is:

1. An ink jet printer for printing a print image on a print medium by selectively depositing ink drops at a plurality of print positions on the print medium, each print position defining a print line on the print medium, in the direction of relative movement of the print medium, comprising:

means for generating a plurality of drop jets directed toward the print medium, means for effectuating relative movement between said print medium and said means for generating a plurality of drop jets, thereby defining print lines which extend in the direction of relative movement of said print medium, and means for selectively deflecting drops from each drop jet to print positions in an associated group of the plurality of print positions, at least two of the print positions in each group of print positions defining print lines which substantially overlap with print lines defined by print positions in adjacent groups of print positions, such that the pattern of drops deposited on the overlapping print lines by each jet is substantially the same as the pattern of drops deposited on the overlapping print lines by adjacent jets.

2. The ink jet printer of claim 1 in which said means for selectively deflecting drops from each drop jet comprises:

charge electrode means for selectively charging each of said drops to one of a plurality of charge levels, including a catch charge level, in response to charging signals, means for generating an electrical deflection field for deflecting drops, catcher means for catching the drops having a catch charge level, and means for supplying charging signals to said charge electrode means such that drops will be appropriately deflected to form collectively the desired print image.

3. The ink jet printer of claim 1 in which said means for selectively deflecting drops includes means for deflecting fewer drops from each jet to the print positions defining print lines which substantially overlap than to the remainder of said print positions in the group serviced by the jet.

4. An ink jet printer, comprising:

a print web, means for generating a plurality of parallel jet drop streams directed at said web, means for selectively charging each drop in said jet drop streams to one of a plurality of charge levels, means for deflecting charged drops in each of said plurality of drop streams to print positions in an associated one of a plurality of groups of adjacent print positions on said web, and means for moving said web such that each of said print positions defines an associated print line on said web, with minimal spacing between adjacent print lines defined by adjacent print positions in each of said plurality of groups and with substantial overlap of print lines defined by print positions in adjacent groups, the pattern of drops deposited on overlapping print lines by each jet being substantially the same as the pattern of drops deposited on the overlapping print lines by adjacent jets, whereby uninterrupted printing may be accomplished across said print web.

5. An ink jet printer for depositing drops of ink on a print medium at print positions such that a print image is formed on the print medium, with each print position defining a print line, comprising:

means for generating a plurality of jet streams, said jet streams being evenly spaced along a jet row, means for moving a print medium relative to said jet row such that the direction of movement of said print medium is oblique with respect to said jet row, and means for selectively deflecting drops in each of said jet streams to a plurality of print positions in a direction which is perpendicular with respect to said jet row, whereby a plurality of said print lines on said print medium are serviced by each jet and whereby a number of print lines are serviced by each jet overlapping those serviced by adjacent jets, and the pattern of drops deposited on the overlapping print lines by each jet is substantially the same as the pattern of drops deposited on the overlapping print lines by adjacent jets.

6. An ink jet printer for printing on a print medium at a plurality of print positions which define respective print lines on the print medium as the print medium is moved with respect to the printer, adjacent print lines being laterally displaced from each other by a minimal distance such that printing may be accomplished without interruption across the web, comprising:

means for generating a row of parallel drop streams, said row extending in a direction which is oblique to the direction of web movement, means for selectively charging each drop in said drop streams to one of a plurality of charge levels, a catcher extending parallel to said row, and means for generating a drop deflecting field substantially perpendicular to said row to deflect the drops in said drop streams by varying amounts in a direction perpendicular to said row of drop streams in dependence upon the level of charge carried by each of said drops, the drops deflected by the greatest and least amounts in each drop stream servicing print positions defining print lines which overlap print lines serviced by adjacent drop streams, and the pattern of drops deposited on the overlapping print lines by each jet being substantially the same as the pattern of drops deposited on the overlapping print lines by adjacent jets.

* * * * *